(12) United States Patent
Wang et al.

(10) Patent No.: US 10,317,281 B2
(45) Date of Patent: Jun. 11, 2019

(54) COMPACT SPECTROMETER

(71) Applicant: Oak Analytics, Agoura Hills, CA (US)

(72) Inventors: Ruibo Wang, Oak Park, CA (US); Pawel Adam Menzfeld, Thousand Oaks, CA (US)

(73) Assignee: Oak Analytics, Agoura Hills, CA (US)

( * ) Notice: Subject to any disclaimer, the term of this patent is extended or adjusted under 35 U.S.C. 154(b) by 0 days.

(21) Appl. No.: 15/387,449

(22) Filed: Dec. 21, 2016

(65) Prior Publication Data

US 2017/0184453 A1 Jun. 29, 2017

Related U.S. Application Data

(60) Provisional application No. 62/415,938, filed on Nov. 1, 2016, provisional application No. 62/272,361, filed on Dec. 29, 2015.

(51) Int. Cl.
*G01J 3/02* (2006.01)
*G01J 3/06* (2006.01)
(Continued)

(52) U.S. Cl.
CPC ............... *G01J 3/10* (2013.01); *G01J 3/021* (2013.01); *G01J 3/0208* (2013.01); *G01J 3/0227* (2013.01); *G01J 3/0256* (2013.01); *G01J 3/0264* (2013.01); *G01J 3/0291* (2013.01); *G01J 3/0297* (2013.01); *G01J 3/06* (2013.01); *G01J 3/18* (2013.01); *G01J 3/2803* (2013.01); *G01J 3/36* (2013.01); *G01J 3/44* (2013.01); *G01J 3/4406* (2013.01); *G01J 3/4412* (2013.01)

(58) Field of Classification Search
CPC ..................... G01J 2003/061; G01J 2003/062
See application file for complete search history.

(56) References Cited

U.S. PATENT DOCUMENTS 4,761,955 A 8/1988 Bloch
5,239,263 A 8/1993 Iwata et al.
(Continued)

FOREIGN PATENT DOCUMENTS

DE 102007039845 2/2008
WO WO2016030674 3/2016

OTHER PUBLICATIONS

International Search Report and Written Opinion dated Mar. 23, 2017 for PCT Application No. PCT/US2016/068338, 6 pages.
(Continued)

*Primary Examiner* — Shawn Decenzo
(74) *Attorney, Agent, or Firm* — Hollingsworth Davis, LLC

(57) ABSTRACT

A compact spectrometer includes an excitation light source configured to generate excitation light and arranged to illuminate a spot on a sample. A dispersive element includes at least one movable component and spatially separates output light emanating from the sample in response to the excitation light into a plurality of different wavelength bands. A moveable component of the dispersive element causes the plurality of different wavelength bands of the output light to be scanned across a detector. The detector includes at least one light sensor that senses the wavelength bands of the output light and generates an output electrical signal in response to the sensed output light.

23 Claims, 14 Drawing Sheets

(51) Int. Cl.
*G01J 3/10* (2006.01)
*G01J 3/18* (2006.01)
*G01J 3/28* (2006.01)
*G01J 3/36* (2006.01)
*G01J 3/44* (2006.01)

(56) References Cited

U.S. PATENT DOCUMENTS

| | | |
|---|---|---|
| 5,396,769 A | 3/1995 | Brudnicki |
| 5,450,193 A | 9/1995 | Carlsen et al. |
| 6,069,419 A | 5/2000 | Tabib-Azar |
| 6,734,963 B2 | 5/2004 | Gamble et al. |
| 7,397,561 B2 | 7/2008 | Yoo |
| 7,483,134 B2 | 1/2009 | Toth et al. |
| 7,505,128 B2 | 3/2009 | Zribi et al. |
| 7,817,274 B2 | 10/2010 | Zhang |
| 8,514,394 B2 | 8/2013 | Yang et al. |
| 8,873,041 B1 | 10/2014 | Chai et al. |
| 9,664,560 B2* | 5/2017 | Williams ............ G01J 3/0205 |
| 2005/0128477 A1* | 6/2005 | Caruso ............... G01J 3/02 356/326 |
| 2005/0154277 A1 | 7/2005 | Tang et al. |
| 2005/0264808 A1 | 12/2005 | Wang |
| 2006/0083284 A1* | 4/2006 | Paldus ............... H01S 5/14 372/97 |
| 2008/0086038 A1 | 4/2008 | Thornton |
| 2009/0262346 A1* | 10/2009 | Egloff ............... G01J 3/02 356/326 |
| 2010/0226541 A1* | 9/2010 | Kobayashi .......... G21C 17/013 382/106 |
| 2012/0099102 A1 | 4/2012 | Bello |
| 2014/0333920 A1* | 11/2014 | Mander ............. G01N 21/3504 356/51 |
| 2015/0070695 A1* | 3/2015 | Minato ............... G01J 3/18 356/319 |
| 2016/0202124 A1 | 7/2016 | Lambert |

OTHER PUBLICATIONS

Li et al., "A Simple Si Pitch-variable Grating with Shape Memory Alloy Actuator", Optics & Laser Technology 34 (8), Nov. 2002, 6 pages.

Bay Spec, "Agility Transportable Dual-ban Benchtop Raman Spectrometer", printed from internet on Oct. 4, 2016, 4 pages.

* cited by examiner

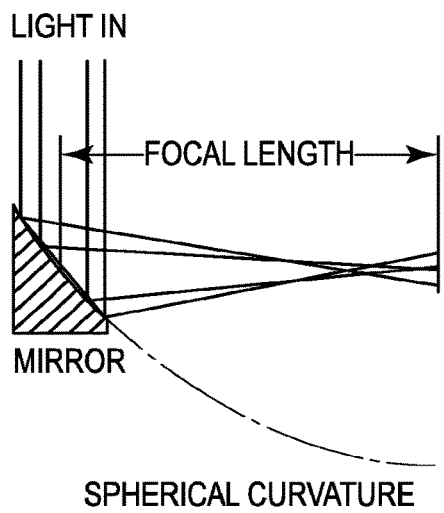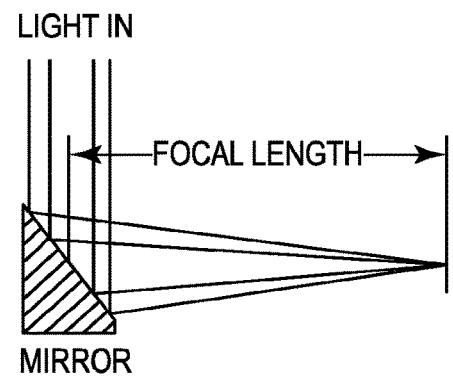
SPHERICAL CURVATURE          ASPHERICAL CURVATURE
FIG. 9A                  FIG. 9B

COMPACT SPECTROMETER

RELATED APPLICATIONS

This application claims the benefit of Provisional Patent Application Ser. No. 62/272,361 filed on Dec. 29, 2015; and Provisional Patent Application Ser. No. 62/415,938 filed on Nov. 1, 2016, to which priority is claimed pursuant to 35 U.S.C. § 119(e), and which are incorporated herein by reference in their entireties.

TECHNICAL FIELD

This application relates to optical spectrometers and to systems and methods related to such optical spectrometers.

BACKGROUND

The Raman spectrum can provide information about molecule vibration and hence be views as a specific signature of a substance. Raman spectroscopy is useful in sample identification and quantization and can be used in fields such as food safety, environmental monitoring, jewelry identification, drug detection, and production process control.

In addition to the Raman spectrum, the fluorescence spectrum from a sample can also be a sensitive indicator of the presence of certain chemicals. Fluorescence spectroscopy can be used in trace detection of heavy metals in water, bacteria detection, and DNA analysis along with other applications.

BRIEF SUMMARY

Some embodiments are directed to a spectrometer device. The device includes an excitation light source configured to generate excitation light having at least first and second distinct wavelength bands derived from a single source. The excitation light source is arranged to simultaneously illuminate a spot on a sample with the first and the second wavelength bands. A dispersive element includes at least one movable component. The dispersive element spatially separates output light emanating from the sample in response to the excitation light into a plurality of different wavelength bands. The at least one moveable component of the dispersive element causes the plurality of different wavelength bands of the output light to be scanned across a detector. The detector includes at least one light sensor that senses the wavelength bands of the output light and generates an output electrical signal in response to the sensed output light.

According to some embodiments, a spectrometer system includes the components described in the previous paragraph along with electronic circuitry. The electronic circuitry is configured to perform one or more of controlling power of the excitation light source, controlling movement of the at least one moveable component, and signal processing the electrical output signal of the detector.

Some embodiments involve a spectrometer device that includes an optical assembly. The optical assembly includes an excitation light source, a dispersive element, and a detector. The excitation light source is configured to generate excitation light wherein the excitation light source is arranged to illuminate a spot on a sample. The dispersive element includes at least one movable component. The dispersive element is configured to spatially separate output light emanating from the sample in response to the excitation light into a plurality of different wavelength bands. The at least one moveable component of the dispersive element is configured cause the plurality of different wavelength bands of the output light to be scanned across the detector. The detector includes at least one light sensor configured to sense the wavelength bands of the output light. The optical assembly has a three dimensional (3D) geometric path for the output light that changes direction at least four times between the sample and the detector.

Some embodiments are directed to a spectrometer device that includes an optical assembly comprising a lens, first mirror, second mirror and a detector. The lens receives output light emanating from a sample in response to excitation light. The lens focuses the output light along a first section of the geometric path of the output light in the optical assembly. The first mirror reflects the output light received from the lens and bends the geometric path of the output light, creating a second section of the geometric path, where the first section and the second section of the geometric path in a first plane. The second mirror reflects the output light received from the first mirror to create a third section of the geometric path of the output light. The third section of the geometric path of the output light travels in a second plane different from the first plane. The detector is configured to detect the output light reflected by the second mirror.

According to some embodiments, an optical assembly for use in a compact spectrometer includes a lens, a concave collimating mirror, a dispersive element, and a concave focusing mirror. The lens is configured to receive output light emanating from a sample. The concave collimating mirror is configured to direct the output light from the lens to a grating. The dispersive element is configured to spatially separate the different wavelengths of the output light into different directions. The concave focusing mirror configured to direct a portion of the output light from the grating to a detector.

Some embodiments involve a spectrometer device comprising at least one light source, a dispersive element, a detector, a processor, and a housing that encloses the light source, dispersive element, detector, and processor. The at least one light source is configured to generate excitation light that illuminates a spot on a sample. The at least one light source is also configured to generate calibration light. The dispersive element comprises at least one movable component. The dispersive element spatially separates an output light emanating from the sample in response to the excitation light and the calibration light into a plurality of different wavelength bands. The at least one moveable component is configured to scan the plurality of different wavelength bands of the output light and the calibration light across the detector. The detector comprises a plurality of sensing elements. At least one first element of the plurality of sensing elements is configured to sense the wavelength bands of the calibration light and to output an electrical calibration signal in response to sensing the calibration light. At least one second sensing element of the plurality of sensing elements is configured to sense the output light and to output an electrical output signal in response to sensing the calibration light. The processor configured to adjust the output signal using the calibration signal.

These and other aspects of the present application will be apparent from the detailed description below. In no event, however, should the above summaries be construed as limitations on the claimed subject matter, which subject matter is defined solely by the attached claims.

BRIEF DESCRIPTION OF THE DRAWINGS

FIG. 9A depicts a mirror having a surface curvature that is spherical;

FIG. 9B depicts a having a surface curvature that is aspherical;

The figures are not necessarily to scale. Like numbers used in the figures refer to like components. However, it will be understood that the use of a number to refer to a component in a given figure is not intended to limit the component in another figure labeled with the same number.

DESCRIPTION OF ILLUSTRATIVE EMBODIMENTS

Embodiments disclosed herein relate generally to optical spectrometers, including Raman spectrometers and fluorospectrometers, and to systems and methods related to such spectrometers.

Figure 1:
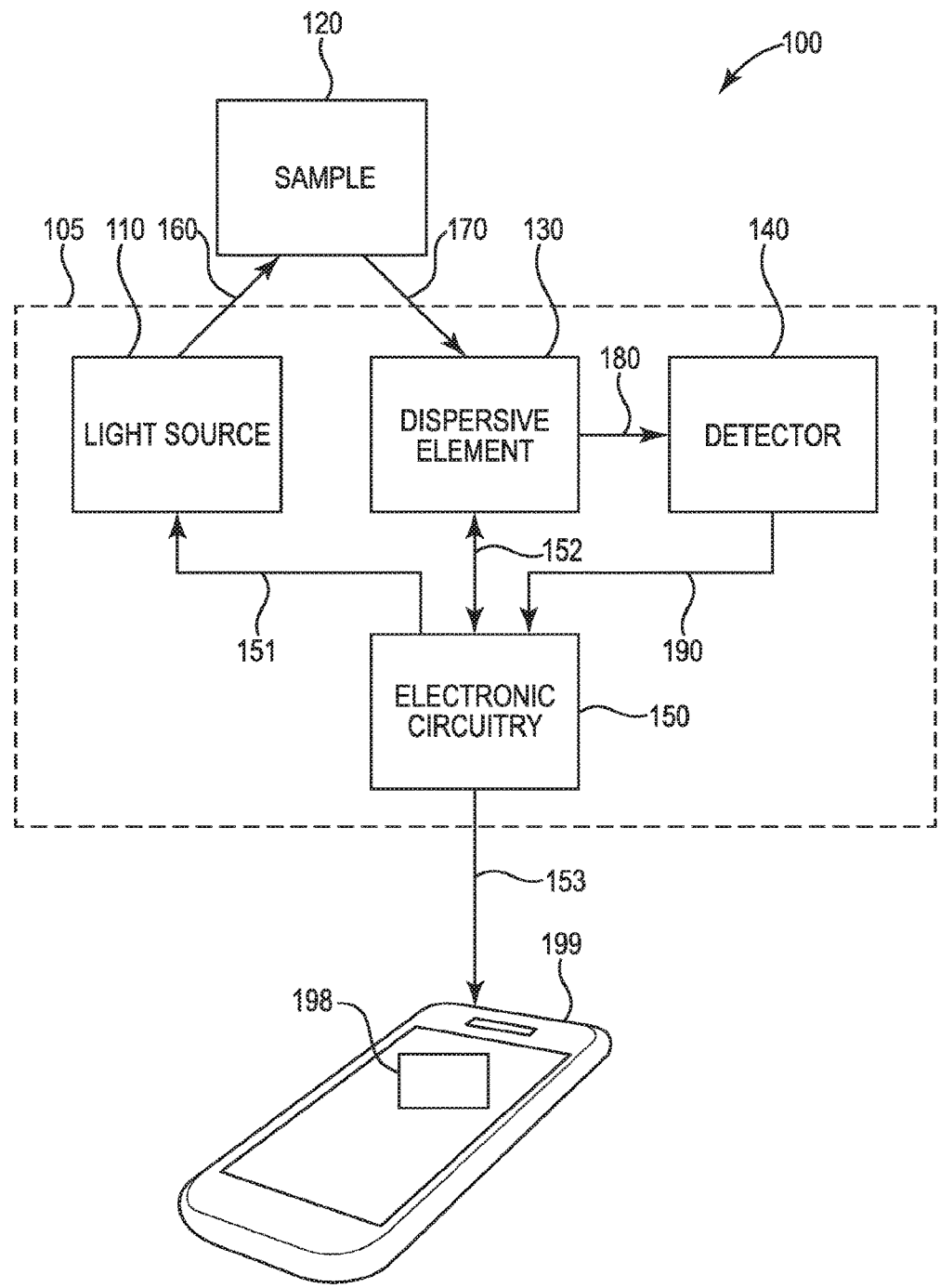
FIG. 1 is a block diagram of a spectrometer system in accordance with some embodiments.

FIG. 1 is a block diagram of a spectrometer system 100 in accordance with some embodiments. In various embodiments, the spectrometer system 100 may be based on single or multiple wavelength light. A single detector or multiple detectors may be used. In some embodiments, multiple detectors are used to enhance wavelength scanning range, sensitivity, and signal to noise ratio (SNR). The spectrometer system 100 may comprise a Raman spectrometer and/or a fluorospectrometer, for example.

The system 100 includes a spectrometer device 105 having components enclosed by the dashed line in FIG. 1. The device 105 includes an excitation light source 110 configured to generate excitation light 160 with is used to excite a sample 120. A dispersive element 130 includes at least one movable component. The dispersive element 130 is configured to spatially separate output light 170 emanating from the sample 120 in response to the excitation light 160 into a plurality of different wavelength bands. The at least one moveable component of the dispersive element 130 scans the plurality of different wavelength bands 180 of the output light across a detector 140. The detector 140 includes at least one light sensor that senses the wavelength bands 180 of the output light and generates an electrical detector output signal 190 in response to the wavelength bands 180 of the output light.

The spectrometer device 105 includes electronic circuitry 150. According to some embodiments, the electronic circuitry 150 may comprise a controller that generates at least one control signal 151, 152 that controls the power of the excitation light source 110 and/or the movement of the at least one moveable component of the dispersive element 130. According to some embodiments the electronic circuitry 150 may include a signal processor that processes the detector output signal 190 and generates a processed signal 152 that includes information about the sample. For example, the signal processor may perform analog to digital conversion of one or more output signals of the detector 130. The electronics 150 can include communication circuitry configured to transmit the processed digital signals to an accessory device 199 such as a smartphone. In various implementations, the digital signals from the spectrometer device may be transmitted to the accessory device over a wireline or wireless channel 153. In some embodiments, all or part of the electronic circuitry 150 may be implemented in hardware. In some exemplary embodiments, the electronic circuitry 150 may be implemented in firmware, software running on a microcontroller or other device, or any combination of hardware, software and firmware.

Data captured by the electronic circuitry 150 of the spectrometer device 105 that includes information about the sample can be transferred to the accessory device 199 which includes an analyzer 198 configured to analyze the data and/or to upload the data and/or results of the analysis to the cloud or other storage. For example, the analyzer 198 may compare the sample spectrum captured by the spectrometer device 105 to one or more known spectra to identify substances in the sample. In some embodiments, the analyzer 198 may use an output from an angle sensor coupled to the dispersive element to determine spectral characteristics of the output light such as an amount of wavelength shift between the excitation signal and the output signal.

One application of the spectrometer system 100 is food safety applications. By comparing the spectrum of a certain food with the authority spectrum from the food manufacturer, the spectrometer system 100 can verify if the food is safe and/or if the food has been tampered with, for example.

In some implementations, the excitation light source 110 may comprise a single light source that emits multiple distinct wavelength bands. The light source is arranged so that the multiple wavelength bands of excitation light simultaneously illuminate the same spot on the sample. The multiple wavelength bands can be used to individually or simultaneously generate output light, e.g., a Raman signal or a fluorescent signal.

Figure 2:
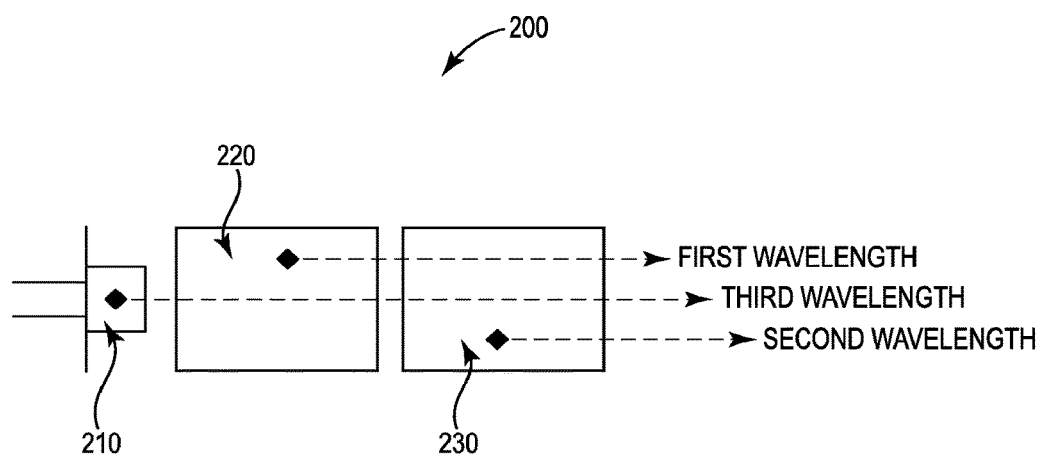
FIG. 2 is a block diagram of a light source that is suitable for use as the excitation light source for the system described in connection with FIG. 1.

FIG. 2 is a block diagram of a light source 200 that is suitable for use as the excitation light source 110 for the system 100 described in connection with FIG. 1. Light source 200 includes a laser 220 that emits excitation light in first wavelength band. The light source includes an optical element 230 configured to convert a portion of the first wavelength band of excitation light into the second wavelength band of excitation light where the second wavelength band is different from the first wavelength band. In various embodiments, the optical element 230 may be disposed within the laser cavity of the laser 220 or outside the laser cavity of the laser 220. The optical element 230 may be a second harmonic generator configured to produce the second wavelength band of excitation light by doubling the frequency of the first wavelength band of excitation light. In some embodiments, the laser 220 comprises a solid state laser, such as a diode pumped solid state (DPSS) laser. The diode 210 that pumps the laser 220 emits light in a third wavelength band that is different from the first and second wavelength bands. In configurations in which the laser 220 is pumped by the diode 210, the light source 200 may be arranged so that the pump light emitted by the diode 210 also simultaneously illuminates the spot on the sample. The first, second, and third wavelength bands are characterized by a central, peak wavelength and are distinct in that there is low or substantially zero wavelength overlap between the first, second, and third wavelength bands. In some configurations, the first wavelength band may be centered at about 1064 nm, the second wavelength band may be centered at about 532 nm, and/or the third wavelength band may be centered at about 808 nm. By using a proper bandpass filter in the geometric path of the excitation light, any one or more of the wavelengths can be selected to illuminate the sample.

The excitation light and/or output light from the sample follows a geometric path of light that may be folded such that the total length of the geometric path of light (including the excitation light and the output light) is greater than the length of the spectrometer device housing. In some embodiments, the length of the geometric path of the output light is greater than the length of the spectrometer device housing. For example, the geometric path of the light of the spectrometer device may comprise a three dimensional (3D) folded geometrical path. The 3D folded geometric path of the output light includes may include a first portion lying in a first plane and including a first bend and a second portion lying in a different, second plane and including a second bend.

Figure 3:
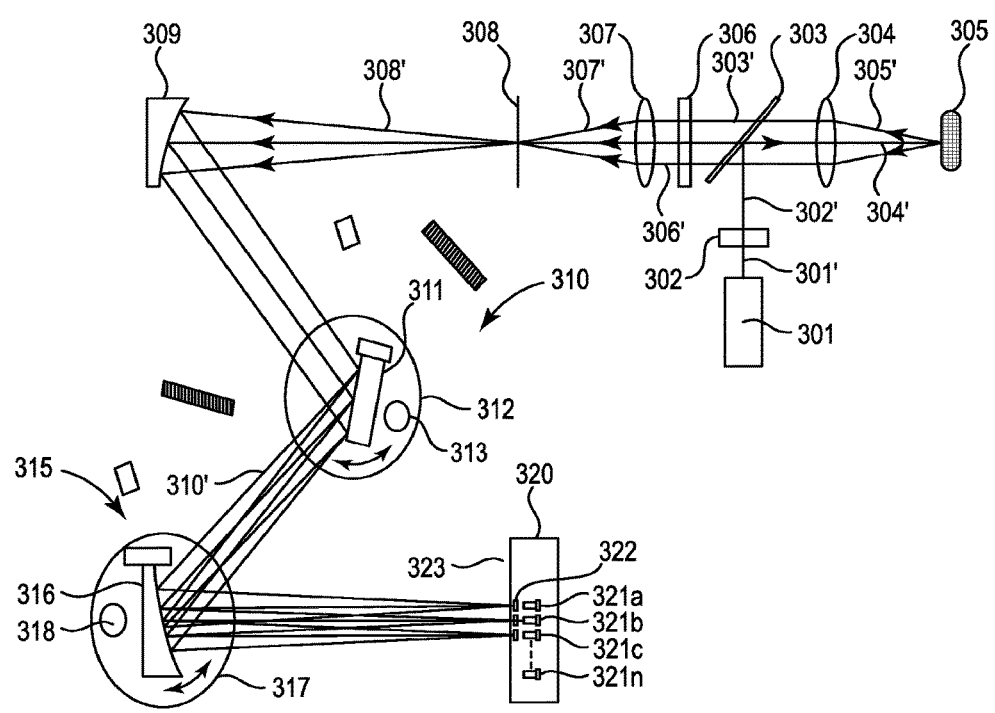
FIG. 3 is a conceptual diagram that illustrates a spectrometer device in accordance with some embodiments.

FIG. 3 is a conceptual diagram that illustrates the spectrometer device 300 in accordance with some embodiments. Light 301' emitted from the light source 301 is directed to a beam splitter 303 that is disposed in the geometric path of the excitation light between the light source 301 and the sample 305. The beam splitter 303 may comprise a dichroic band pass filter and/or a 45 degree notch filter, for example. The beam splitter 303 reflects the excitation light 302' while passing the output light 303' at wavelengths greater than or less than the excitation light 302'. As previously discussed, the light source 301 may comprise a laser that is configured to emit light in multiple wavelength bands. For example, the laser may be a diode pumped solid state laser as previously discussed.

Figure 4:
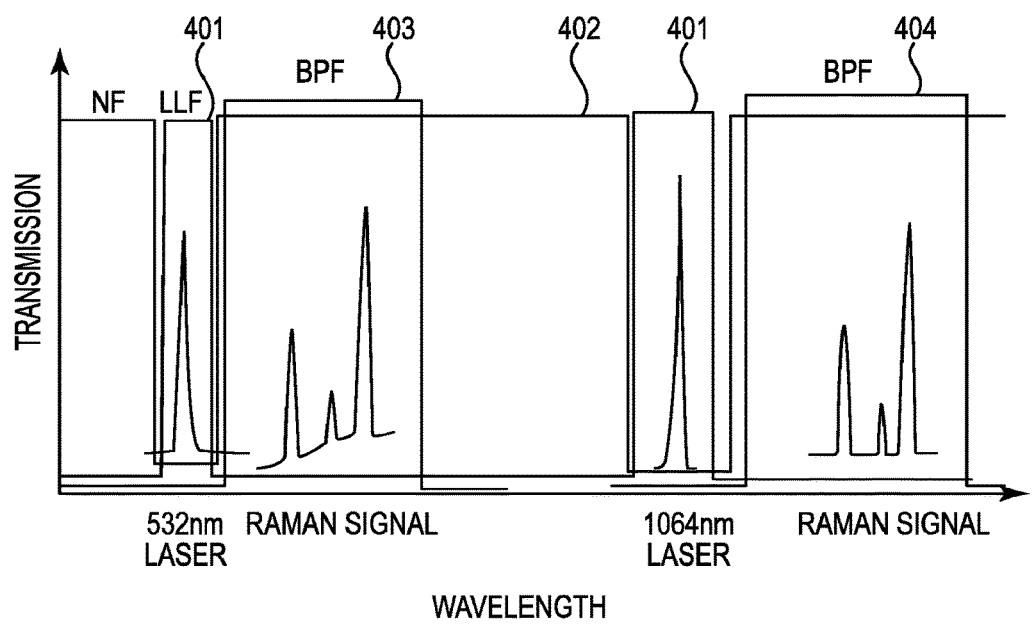
FIG. 4 shows the transmission spectra of a suitable laser line filter (LLF) in accordance with some embodiments superimposed over a 532 nm wavelength laser signal and a 1064 nm wavelength laser signal.

In some embodiments, there may be a laser line filter 302, e.g., a bandpass optical filter, disposed between the light source 301 and the beam splitter 303 and/or between the beam splitter 303 and the sample 305. The laser line filter 302 is configured to substantially pass the one or more of the wavelength bands of light emitted by light source 301 and to substantially block other wavelengths such as sideband wavelengths of the excitation light. If not blocked, these sideband wavelengths may interfere with detection of the output light. The transmission spectra 401 of a suitable laser line filter (LLF) in accordance with some embodiments is shown in FIG. 4 superimposed over a 532 nm wavelength laser signal and a 1064 nm wavelength laser signal.

To reduce interference of ambient light, the excitation light source 301 may be modulated at a frequency Fm. Thus the ambient light can be removed from the output light signals using a lock in amplifier, or using signal processing including Fourier transformation, for example.

Figure 5:
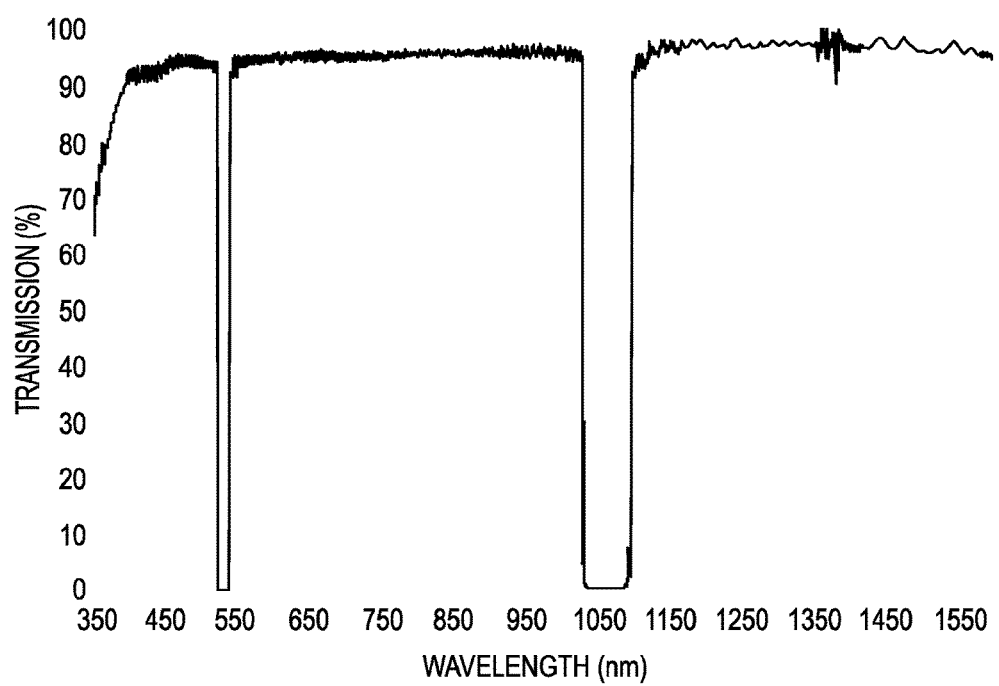
FIG. 5 shows the transmission spectrum of a double band notch filter that is suitable for some embodiments of a spectrometer device.

In response to the excitation light 304' incident on the sample 305, the sample 305 emanates output light 305'. For example, the output light 305' may be due to Raman scattering of the excitation light 304' and/or absorption of the excitation light 304' and re-emission of fluorescent output light 305'. The output light 305' may be collimated by a collimating lens 304, passing through the beamsplitter 303 to an optical notch filter 306. The optical notch filter 306 may be used to substantially pass the collimated optical output signal 303' and to substantially block the excitation light 301', 302'. An example of the transmission spectrum 402 of a suitable notch filter is shown in FIG. 4 indicating substantial blocking at excitation light wavelengths 532 nm and 1064 nm and substantial transmission at other wavelengths. FIG. 5 shows the transmission spectrum of a double band notch filter that is suitable for some embodiments of a spectrometer device. The double band notch filter can be used to block excitation light in multiple wavelength bands while transmitting the output light signals.

According to some embodiments, the filtered output light 306' is focused onto a slit 308 by a focusing lens 307 which is disposed in the geometric path of the output light between the optical filter 306 and the slit 308. Output light 308' emerging from the slit encounters a concave mirror 309 that redirects the light 308' onto a dispersive element 310. For example, the dispersive element 310 may include a diffraction grating 311, e.g., a reflective diffraction grating, that separates the output light into spatially separated wavelength bands 310'. In some embodiments, the diffraction grating 311 may be movable, such that rotation of the diffraction grating 311 scans the wavelength bands 314 of the output light across a detector 320. As the grating 311 is rotated, at a certain angle when the output light is scanned, the detector 320 catches the output light. An angle sensor 313 associated with the rotating shaft of the diffraction grating 311 is used to monitor the angle of the grating 311. Thus, the wavelength and light intensity can be correlated to obtain the spectrum of the output light.

Rotating the grating 310 may be achieved using a grating actuator 312 mounted to the diffraction grating 311 and configured to rotate the diffraction grating 311. As the diffraction grating 311 is rotated by the grating actuator 312, different wavelength bands of the output light fall on the detector 320 when the diffraction grating 311 is at different positional angles. For example, the grating actuator 312 may comprise one or more of a motor, a shape memory alloy (SMA) actuator, a muscle wire actuator, a solenoid actuator, and/or a piezoelectric actuator. The muscle wire actuator, for example, is based on the temperature dependent length of SMA wires. When a voltage is applied across the wires, a rotation angle up to about 60 degrees, or in some cases even greater than 60 degrees can be obtained.

In some embodiments, the dispersive element includes a grating angle sensor 313 configured to detect positional angles of the diffraction grating 311. For example, the grating angle sensor 313 may comprise at least one of a magnetic angle sensor, a microelectromechanical system (MEMS)-based gyroscope, an imaging sensor array, an optical position sensing detector, and a capacitance sensor. The magnetic angle sensor, for example, senses the angle change by measuring the field direction of a permanent magnet mounted on the grating.

The angle of the diffraction grating 311 can be used to determine spectral characteristics of the wavelength bands. For example, the angle of the diffraction grating 311 can be used to indicate the amount of wavelength shift between the excitation light and the output light. Substances present in the sample may be detected based on the Raman wavelength shift or fluorescence of the sample. In some implementations, a Raman spectrum of the sample may be obtained by sampling a number of wavelengths around the center frequency of the excitation light. The Raman wavelength shift may be related to substances in the sample. Fluorescent characteristics of substances suspected to be present in the sample may be obtained by sampling wavelengths associated with the fluorescent response of the suspected substances.

In some embodiments, the spectrometer device 300 may include a moveable focusing mirror 315 configured to focus the wavelength bands 310' from the dispersive element 310 onto the detector 320. The moveable mirror 315 comprises a focusing mirror element 316 and a mirror actuator 317 configured to rotate the focusing mirror element 316 to difference rotational mirror angles. For example, the mirror actuator 317 may comprise one or more of a motor, a shape memory alloy (SMA) actuator, a solenoid actuator, and/or a piezoelectric actuator.

In some embodiments, the moveable focusing mirror 315 includes a mirror angle sensor 318 configured to detect positional angles of the mirror element 316. For example, the mirror angle sensor 318 may comprise at least one of a magnetic angle sensor, a microelectromechanical system (MEMS)-based gyroscope, an imaging sensor array, an optical position sensing detector, and a capacitance sensor. The angle of the diffraction grating can be related to spectral characteristics of the wavelength bands. For example, the angle of the diffraction grating can be related to the amount of wavelength shift between the excitation light and the output light.

The angle of the diffraction grating 311 and/or the angle of the mirror element 316 as sensed by the diffraction grating angle sensor 313 and/or the mirror angle sensor 318 can be used to determine spectral characteristics of the wavelength bands. For example, the angle of the diffraction grating 311 and/or the angle of the mirror 316 can be used to indicate the amount of wavelength shift between the excitation light and the output light.

Focused wavelength bands of light 315' from the focusing mirror 315 are directed through one or more slits 323 to the detector 320. In some embodiments, the detector 320 includes multiple light sensors 321a, 321b, 321c, 321n and in some embodiments, only a single sensor is used. In some implementations, the detector 320 may comprise an imaging sensor array. According to some embodiments, the one or more light sensors comprise InGaAs sensors.

Each sensor 321a, 321b, 321c, 321n may be associated with an optical bandpass filter 322 having a specific passband. Each optical filter 322 may have a passband that is different from other optical filters so that each light sensor 321a-n is sensitive to a specific portion of the spectrum of the output light. The transmission spectra 403, 404 for a suitable bandpass filters is shown in FIG. 4. A bandpass filter having the transmission spectrum 403 may be used for one of the optical filters 322 and the transmission spectrum 404 may be used for another of the optical filters 322 in some embodiments. The transmission spectrum 403 is shown superimposed over output light generated by Raman scattering in response to the 532 nm excitation light. The transmission spectrum 404 is shown superimposed over output light generated by Raman scattering in response to the 1064 nm excitation light. Using these bandpass filters 322, cross talk caused by higher order diffraction or anti-Stokes Raman shift can be prevented.

In the Raman spectra shown in FIG. 4, the base line of signals generated by the 532 nm excitation light is not flat due to fluorescence induced by the 532 nm light. In the spectra generated by the 1064 nm excitation wavelength, a stronger fluorescence signal can be observed. By using a switchable laser line filter, which may be a mechanically movable filter or an electrically tunable filter, for example, either one or two wavelength bands can be used as the excitation.

In a spectrometer using both the 532 nm and 1064 nm excitation wavelengths, fluorescent light may be generated more easily by the 532 nm light than by the 1064 nm light. For some materials, the efficiency of fluorescence generation is thousands of times higher than Raman signal generation. By analyzing the fluorescence spectrum, more information can be obtained about the sample under test. Thus, for some materials, the spectrometer can be used as a fluorospectrometer.

In a spectrometer that uses a multi-sensor scheme, the noise level can be reduced when compared to a spectrometer that uses a single sensor. By using the multiple detection points, the SNR can be reduced by a square root of the number of detectors. Additionally, the multi-sensor detection scheme can subtract the fluorescent signal from the Raman signal at the hardware level, providing more accurate and more efficient detection. By using multi-sensor detection, two or more different types of light sensors can be used, e.g., (two or more of a charged coupled device (CCD), a semiconductor photodetector, a Si photodetector, an InGaAs photodetector, a Ge photodetector, a photomultiplier, a solid state photomultiplier (APD) and/or an APD array. The use of different types of photodetectors can significantly increase wavelength scanning range and sensitivity.

Some embodiments are directed to a spectrometer having an optical assembly comprising folded geometric light path and optical components configured to reduce the size of the spectrometer. The optical assembly disclosed herein enables high spectral resolution without the need for long focal length optics. In accordance with the embodiments disclosed herein, dimensions of a spectrometer can be largely reduced to a size much smaller than conventional handheld spectrometers such that the disclosed spectrometer is small enough to be easy to carry and convenient for material identification in field.

In some conventional optical spectrometers, the geometric light path is folded in a single plane so that all the optical components are mounted on the same platform. The advantage of such a configuration is the convenience of optical alignment. However, the disadvantage is that the spectrometer has a relatively large size. The spectrometer disclosed herein includes an optical assembly comprising a 3D-folded geometric light path such that all the components of the optical assembly can be integrated into a much smaller package. As used herein, 3D-folded geometric light path means that a portion of the geometric light path that includes at least one bend is in a first plane and a second portion of the geometric light path that includes at least a second bend is in a second plane different from the first plane. As used herein, a "bend" is defined as a change in the direction of the geometric light path such that the geometric light path before the bend and the geometric light path after the bend define a plane.

The spectrometer described herein enables a much more compact system such that in some configurations, the optical assembly of the spectrometer device from the light source to the detector can be held in the palm of one hand. In one example, the longest dimension of the exterior case housing the optical assembly is substantially less than the geometric path length of the light from the light source to the detector, for example, the longest dimension of the optical assembly of the photometer may be kept to less than ½ and in some cases less than ⅓ the total length of the geometric light path from the light source to the detector. Thus in some embodiments, the dimensions of the optical assembly of the spectrometer is less than 150 mm×40 mm×50 mm.

In the optical train, excitation light from a laser may generate output Raman and/or fluorescence light signals in response to the excitation light. Then through a set of optical components including one or more lenses, one or more filters, one or more mirrors, at least one diffraction grating and/or one or more slits, the output light is collected by a photodetector. The selection and arrangement of the optical components ensure high spectral resolution and high light collection efficiency. From the input slit to the output slit, the spectrometer is actually a 1:1 imaging system. To reduce the optical aberrations, a pair of 90-deg off-axis aspherical mirrors may be used in the optical train.

As previously discussed, the spectrometer uses a light source such as a laser. For example a semiconductor laser with a narrow spectral line width may be used as the excitation source. To collect and analyze the generated Raman and/or fluorescence signals, the spectrometer may use the following major components to form a spectrometer with relatively high resolution, e.g., less than about 0.2 nm.

In some embodiments, the spectrometer includes an input slit, collimating mirror, grating, focusing mirror, output slit and photodetector. The grating can be rotated around its axes over a large angle, e.g., greater than about 40 degrees, or greater than about 45 degrees, or even greater than about 50 degrees, in order to cover a wide spectral range. Spectral processing and filtering components in front of the photodetector may include one or more of a collimating lens, a laser line blocking filer and/or a focusing lens, for example.

Figure 7:
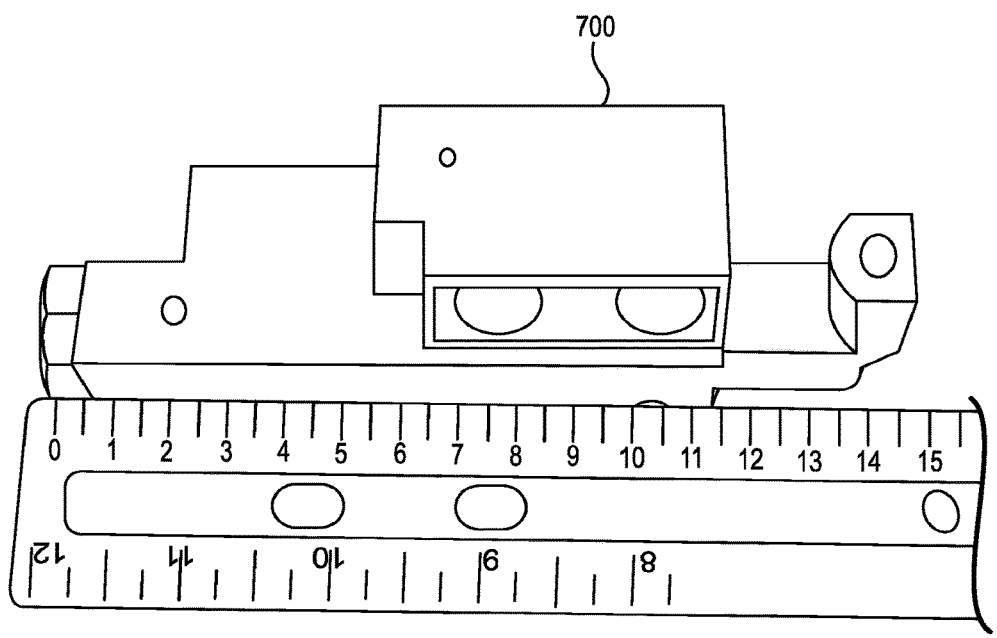
FIG. 7 is a photograph of a frame for a spectrometer device in accordance with some embodiments.
Figure 8:
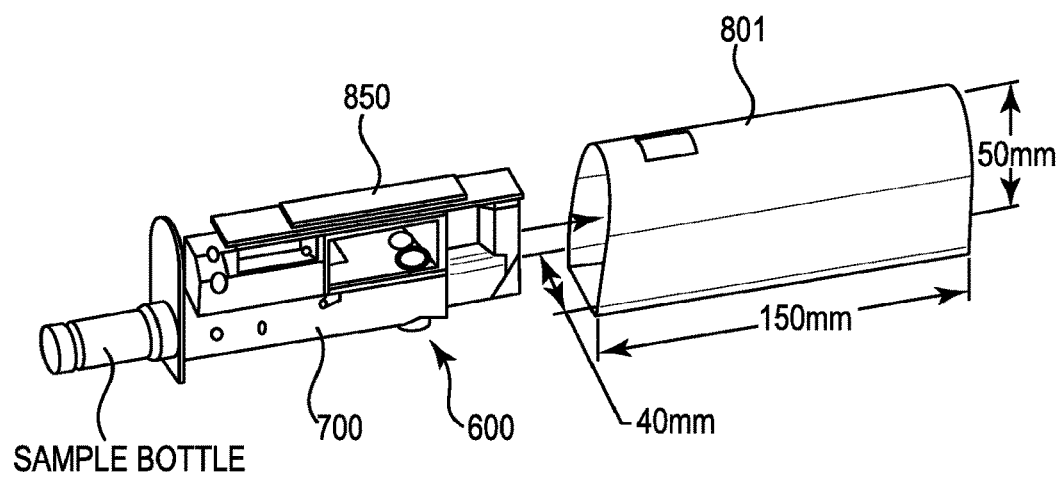
FIG. 8 is perspective diagram of a frame, portions of an optical assembly, and electronic circuitry contained in a housing in accordance with some embodiments.

Turning now to FIGS. 6A through 6D, several views of an optical assembly 600 for a spectrometer are illustrated, showing the optical assembly from various perspectives. The components 601 to component 617 are attached to a frame 700 illustrated in FIG. 7. The frame 700, portions of the optical assembly 600, and electronic circuitry 850 are contained in a housing 801 as illustrated in FIG. 8. During operation of the spectrometer, the electronic circuitry 850 collects spectrum data and may send the data to a smartphone through Bluetooth® or other wireless or wireline communication protocol as previously discussed.

Figure 6A:
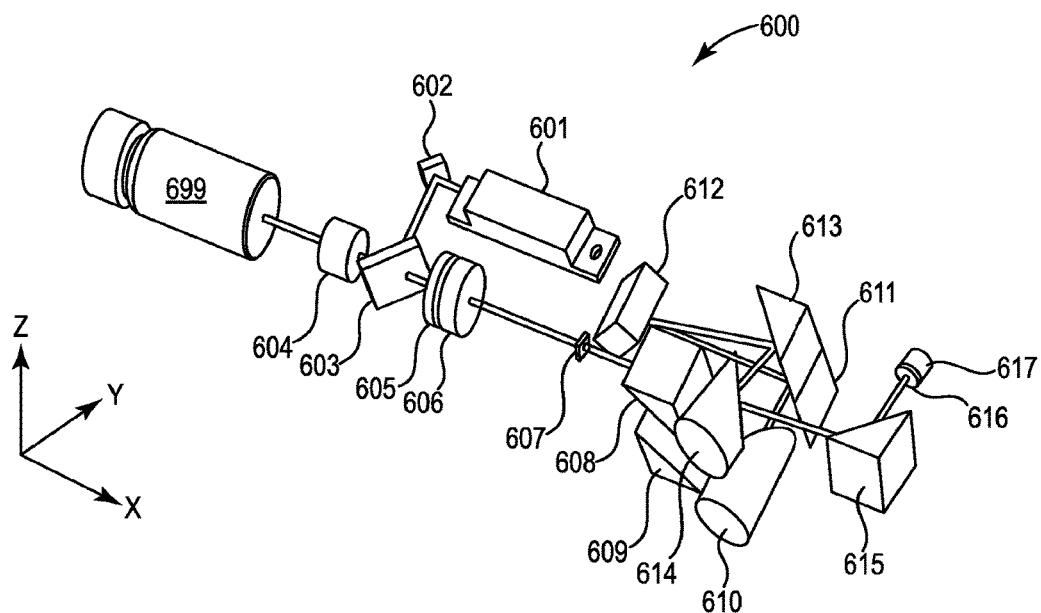
FIGS. 6A through 6D show various views of an optical assembly for a spectrometer device in accordance with some embodiments.
Figure 6B:
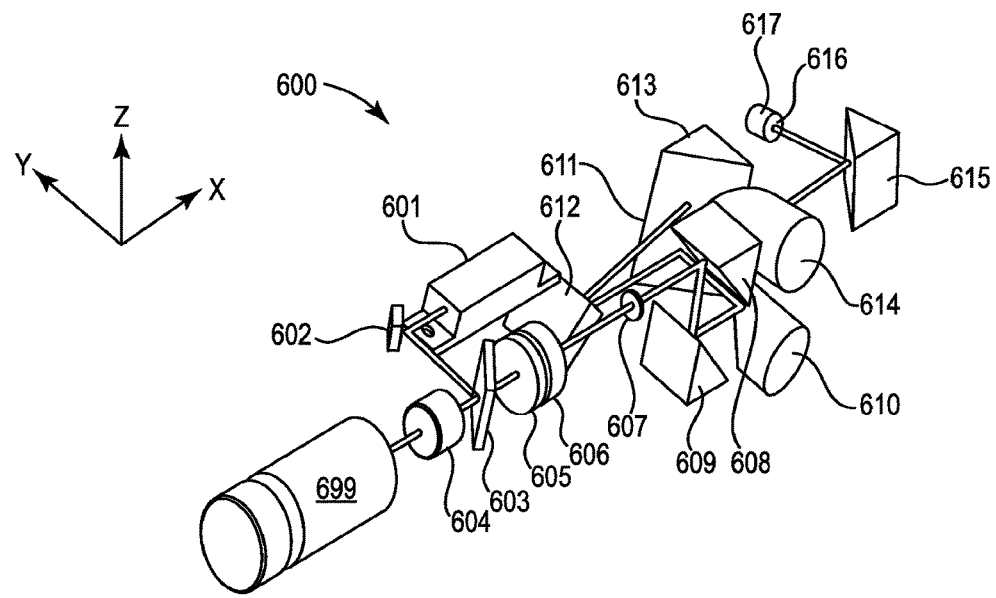
Figure 6C:
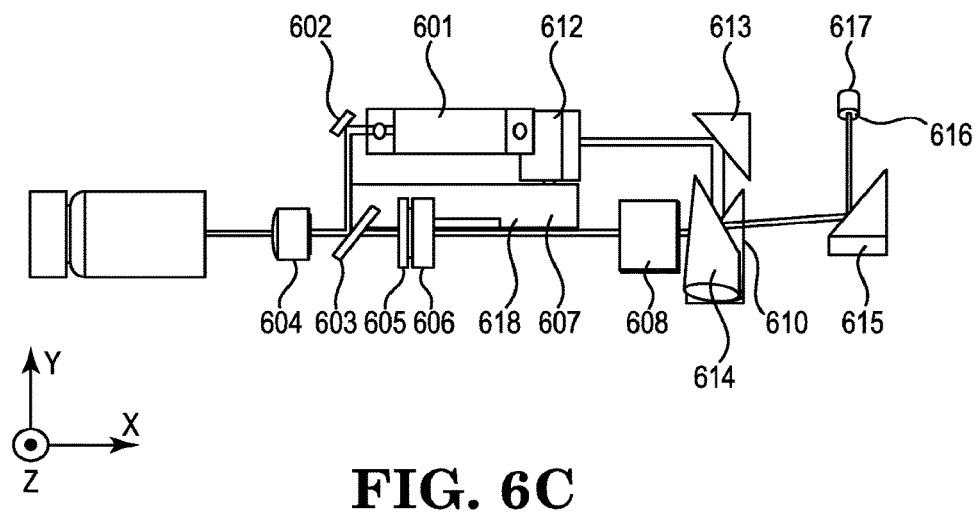
Figure 6D:
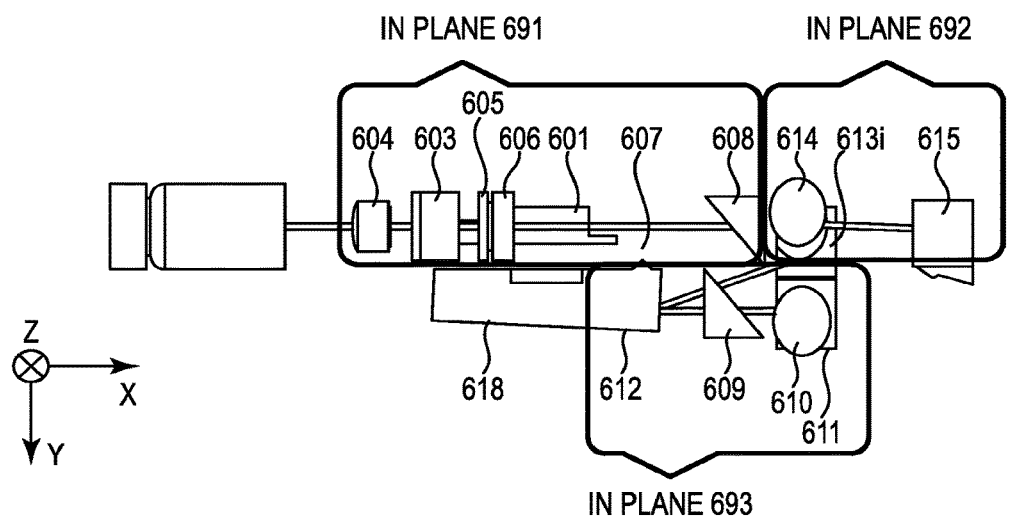

Returning now to FIGS. 6A through 6D, there is shown an optical assembly 600 in accordance with some embodiments. The optical assembly 600 includes an excitation light source 601, such as a laser, that generates excitation light. A mirror 602 redirects the excitation light toward a long pass beam splitter 603. In some embodiments, the long pass beam splitter may be replaced by a notch filter. The beam splitter 603 directs the excitation light through a focusing lens 604 which focuses the excitation light onto the sample 699 contained in a bottle. Output light emanating from the sample 699 in response to the excitation light is collimated by the focusing/collimating lens 604, and passes through the beamsplitter 603. The output light interacts with an optical notch filter 605 that substantially passes the collimated output light and substantially blocks the excitation light. The notch filter may have a diameter of about 12.5 mm. The focusing/collimating lens may have a focal length of about 9 mm and a diameter of about 9 mm, for example. The output light is focused by a lens 606 onto a slit 607. The input slit 607 may have dimensions of about 3 mm×about 0.03 mm, for example. The geometric light path from laser 601 to mirror 607 is in a first plane 691 as shown in FIG. 6D.

The output light is redirected through a number of bends by mirrors 608 through 611 until the output light in incident on the grating 612. Mirrors 608 and 609 shift the geometric light path down to a lower level along the z axis shown in FIGS. 6A through 6D and into a second plane 692. In one embodiment, mirror 607 redirects the light 90 degrees downward and mirror 608 redirects the light another 90 degrees such that the geometric light path exiting mirror 608 is in second plane 692 although other angles are also possible. In the illustrated embodiment, second plane 692 is approximately parallel to first plane 691. Light transmitted through the slit 607 is then collimated by concave mirror 610, reflected by mirror 611 and directed onto grating 612. In some embodiments, the grating is a holographic reflection grating having a spatial frequency of about 2400 l/mm. Mirror 610 may comprise a collimating mirror and may be parabolic or aspheric, for example. As previously discussed, the grating may be rotatable and may be associated with an angle sensor that detects the rotational position of the grating. The output light is spatially separated into wavelength bands by the grating and it is directed to a mirror 613 which redirects the output light to a focusing mirror 614. The focusing mirror may be a concave silver mirroring having a focal length of about 50 mm. The focusing mirror 614 redirects the output light to a mirror 615, through a slit 616 and to the detector 617. The output slit may have dimension of about 3 mm by about 0.03 mm, for example. The photodetector may be a single element silicon detector in some embodiments.

Reflection grating 612 diffracts light at different wavelengths into different angles such that each wavelength corresponds to an angle. The diffracted light beam is then directed by mirror 613 to concave mirror 614 in upper level along the z-axis shown in FIGS. 6A through 6D. In the illustrated embodiment the geometric light path from mirror 613 to photodetector 617 remains in an upper level. In some embodiments, the upper level may be the same as plane 691 although in some embodiments, the upper level may be in a third plane 693 different from planes 691 and 692. The third plane 693 may or may not be substantially parallel to plane 691 and plane 692. The second plane 692 may or may not be substantially parallel to planes 691 and 693.

Concave mirror 614 focuses the light beam onto the output slit 616. At each setting angle of grating 612, only a very narrow range of wavelengths can pass slit 616 and be received by photodetector 617. A grating rotating mechanism 618 rotates grating 612 to move the different wavelengths of light onto photodetector 617. As the grating 612 rotates, different wavelengths of light reach photodetector 617 allowing a continuous spectrum to be obtained.

The resolution of a spectrometer is highly dependent on the imaging quality of the system. Usually the lower aberrations, the higher resolution can be obtained. In order to ensure a low aberration, the surface curvature of the two concave mirrors 610 and 614 should be aspherical instead of spherical. As shown in FIGS. 9A and 9B, when the surface curvature of the 90-deg off axis mirror is spherical as in FIG. 9A, the collimated input light cannot be focused into a tight spot mainly due to an effect called spherical aberration. The application of aspherical curvature as shown in FIG. 9B is an effective way to reduce spherical aberrations and achieve high spectral resolution.

With reference to FIGS. 6A through 6D, some embodiments involve a compact spectrometer capable of Raman and/or fluorescent analysis. The optical assembly defines a geometric light path between the excitation light 601 and the detector 617. The geometric light path may be folded, showing multiple bends. For example, as shown in FIGS. 6A through 6D, the optical assembly uses components 602, 603, and 608-615 that cause the geometric light path to go through a number of bends. An optical assembly according to various embodiments may use components that cause the geometric light path to bend 3-15 times along the optical path. For example in some embodiments an optical assembly may have components that cause the geometric light path to bend at least about 4 times or even up to about 15 times or more times between sample and the detector. The components may cause the geometric light path to bend at least 4 times or up to about 10 times between the sample and the diffraction grating. The spectrometer includes an optical assembly 600 having a lens 606 to receive light scattered by a sample 699. The lens 606 focuses the light along a first section of a light path. First mirror 608 reflects light received from the lens 606 to bend the geometric light path and create a second section of the geometric light path, the first section and the second section of the geometric light path in a first plane 691. Second mirror 609 reflects light received from the first mirror 606 to create a third section of the geometric light path, the third section of the geometric light path traveling in a second plane 692 different from the first plane 691. The spectrometer includes a detector 617 to detect light reflected by the second mirror 609.

The optical assembly 600 of the compact spectrometer also includes a grating 612 to receive light from the second mirror 609 and to spatially separate light received from the second mirror 609 into wavelength bands having different angles, each angle corresponding to a wavelength band of light received by the grating. In some embodiments, a motor or other actuator may be arranged to rotate the grating 612. The optical assembly 600 of the spectrometer also includes a concave mirror 610 to collimate and direct the light from the grating 612 to the detector 617. In some embodiments, the concave collimating mirror 610 may be aspheric. In some embodiments, the concave collimating mirror may be parabolic. The detector 617 may comprise a photodetector having dimensions of less than about 3 mm to about 13 mm. The optical assembly of a compact spectrometer also includes a light source 601 to produce light to direct onto the sample 617.

The spectrometer that utilizes the optical assembly 600 can have a longest dimension of the outer housing framing the spectrometer is less than one half the total geometric path length of the light from the light source to the detector. The longest dimension of the outer housing framing a spectrometer that includes the optical assembly 600 may be less than about one half or even less than about one third the total geometric path length of the light from the light source 601 to the detector 617. For example the longest dimension of the outer housing framing the spectrometer may be less than about six inches. A total volume of the housing may be less than about 500 cm$^3$ or less than about 300 cm$^3$. A length of the housing may be less than about 150 mm, a width of the housing may be less than about 40 mm, and a height of the housing may be less than about 50 mm, for example.

Some embodiments involve a spectrometer capable of real time calibration, where real time calibration means that the measurements of the output light and calibration light can be performed simultaneously or close together in time. In conventional spectrometers using grating scanning method, usually the wavelength is correlated to the grating's rotation angle. By monitoring the rotation angle with an optical encoder or other rotation sensors, the wavelength of an unknown light signal can be obtained. However, calibrations are done generally at the spectrometer's beginning of life in factory and/or at periodic intervals to correct the long term drifting of grating's angle readings. Calibration for these conventional spectrometers is a dedicated procedure, and the spectrometer cannot be used for sample measurement during calibration.

Embodiments disclosed herein use a miniature light source included in the spectrometer for calibration. Light from the miniature light source and the unknown light signal to be measured are scanned simultaneously by the grating.

In conventional spectrometers the calibration data is stored in the memory as a lookup table. The lookup table is updated each time after calibration. The measurement results may be erroneous if the calibration is not done timely. In contrast, according to the approach disclosed herein, wavelength error can be corrected in real time.

Figure 11:
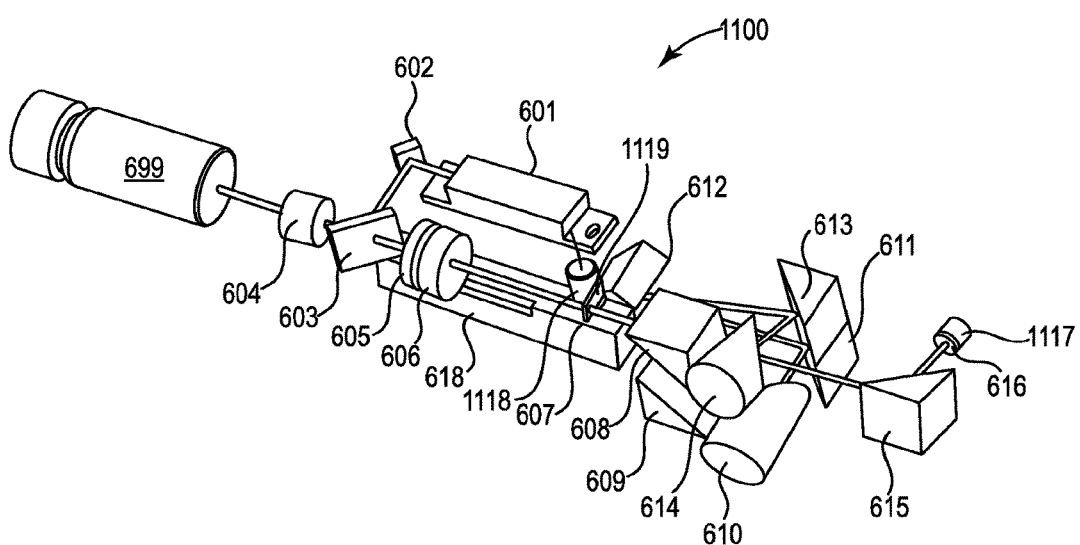
FIG. 11 shows optical components of spectrometer device that has the capability of real time calibration in accordance with some embodiments.

Embodiments disclosed herein are directed to an optical spectrometer capable of real time calibration so that the wavelengths of Raman and/or fluorescence signals can be accurately obtained. As illustrated in FIG. 11, a spectrometer device 1100 that includes the capability of real time calibration includes a light source with known emission spectral lines such as a neon light bulb, an argon light bulb, or a multi-wavelength laser as the calibration light source. In some embodiment, the spectrometer includes a light guide, such as a prism, to direct the light from the calibration light source into the spectrometer. The detector of the spectrometer may include dual light sensors, one for detection of the Raman/fluorescence signal and one for detection of the calibration light.

Figure 10:
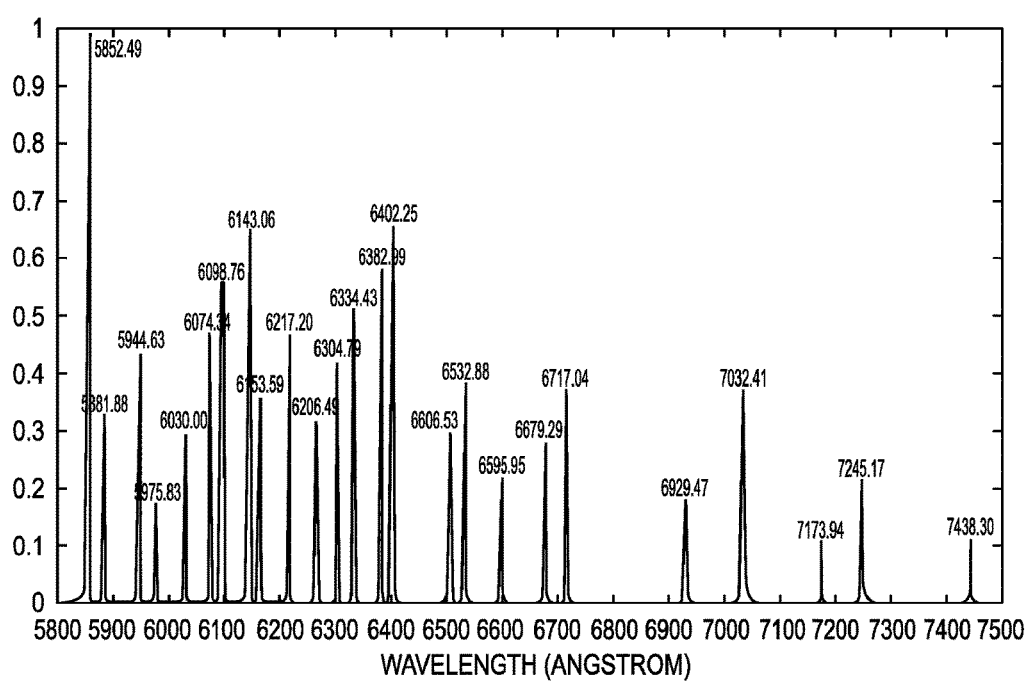
FIG. 10 shows the spectrum of a neon light bulb.

FIG. 10 shows the spectrum of a neon light bulb as an example. It has 25 peaks with known wavelengths within the range from 580 nm to 750 nm. Using these peaks as references, a spectrometer can be calibrated with high accuracy. FIG. 11 shows portions of spectrometer device that has the capability of real time calibration in accordance with some embodiments. The optical assembly 1100 of FIG. 11 has many similarities to the optical assembly 600 illustrated in FIGS. 6A through 6D where similar components are indicated with the same reference numbers. The optical assembly 1100 differs from the optical assembly 600 in that it includes a calibration light source 1118 configured to generate calibration light. For example in some embodiments, the calibration light source 1118 may be a neon light bulb, an argon light bulb, or a multi-wavelength laser. When a multi-wavelength laser is used, both the excitation light and the calibration light can be generated by a single source. The multi-wavelength laser may be configured to emit light in at least a first wavelength band and a second wavelength band, wherein the excitation light comprises light emitted from the multi-wavelength laser in the first wavelength band and the calibration light comprises light emitted from the multi-wavelength laser in the second wavelength band. The calibration light is routed through a light guide 1119 to the grating 612 and eventually to a dual element detector 1117.

Figure 12:
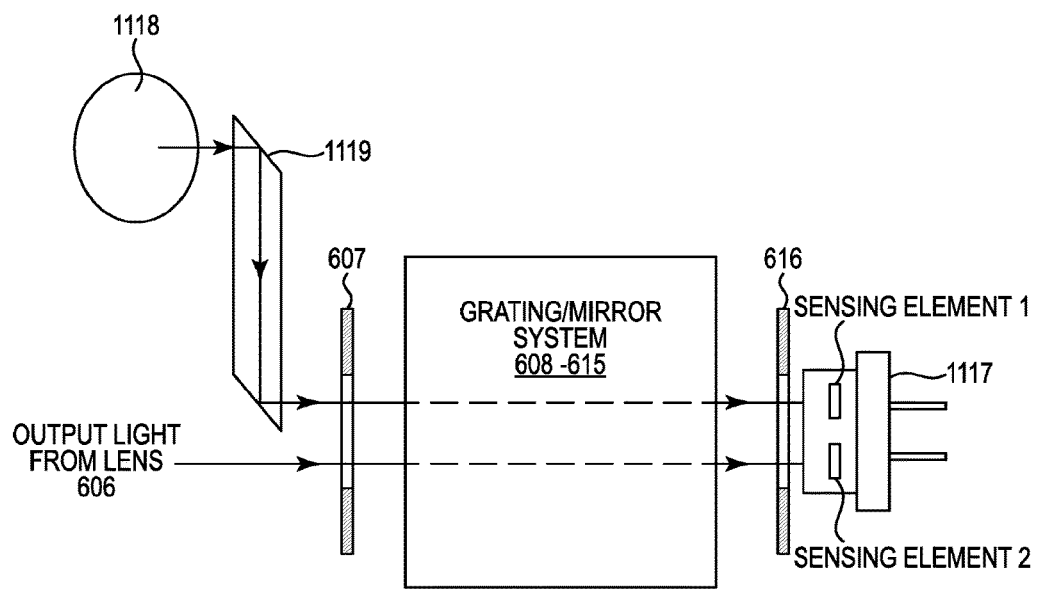
FIG. 12 shows the calibration components and geometric light path of the calibration light of FIG. 11 in more detail.

FIG. 12 shows the calibration components and geometric light path of the calibration light in more detail. With reference to FIGS. 11 and 12, excitation light from the excitation light source 601 sequentially interacts with components that include a mirror 602 and long pass beam splitter 603, and is then focused by lens 604 into the sample 699 under test contained in a bottle. The sample scatters or emits output light towards the optical assembly, the output light may include Raman, fluorescence light, for example, and the output light is collected by collimating lens 604.

The output light is collected by lens 604 which acts as a collimating lens for the output light. After passing through filters 603 and 605, the collimated light beam is focused by lens 606 onto slit 607. Subsequently mirrors 608 and 609 shift the geometric light path down to a lower level (along the z-axis) as previously discussed. Light transmitted through the slit 607 is then collimated by concave mirror 610, reflected by mirror 611 and directed onto grating 612.

Reflection grating 612 diffracts light at different wavelengths into different angles such that each wavelength corresponds to an angle. The diffracted light beam is then directed by mirror 613 to concave mirror 614. Concave mirror 614 focuses the light beam onto the output slit 616. At each setting angle of grating 612, only a very narrow range of wavelengths can pass slit 616 and be received by photodetector 1117. A grating rotating mechanism 618 rotates grating 612 to move the different wavelengths of light onto photodetector 1117. As the grating rotate, different wavelengths of light reach photodetector 1117, thereby, a continuous spectrum of the output light can be obtained.

The calibration light for wavelength calibration is emitted by a light bulb 1118 and directed to the input slit 607 by prism 1119. The geometric path of the calibration light is best seen in FIG. 12. Both the calibration light and output light interact with components sequentially from 607 to 616. There is a gap existing between the calibration light spot the output light spot at the input slit 607. Through the dispersion system composed of grating and mirrors, the two spots are imaged onto two sensing elements (sensing element 1 and sensing element 2) in the photodiode detector 1117. A gap between the two sensing elements equals the gap between the output light and calibration light spots at the input slit 607. At each setting angle of the grating, the two sensing elements receive light at the same wavelength though they are from different sources, one from neon light bulb and the other from the sample under test.

Figure 13:
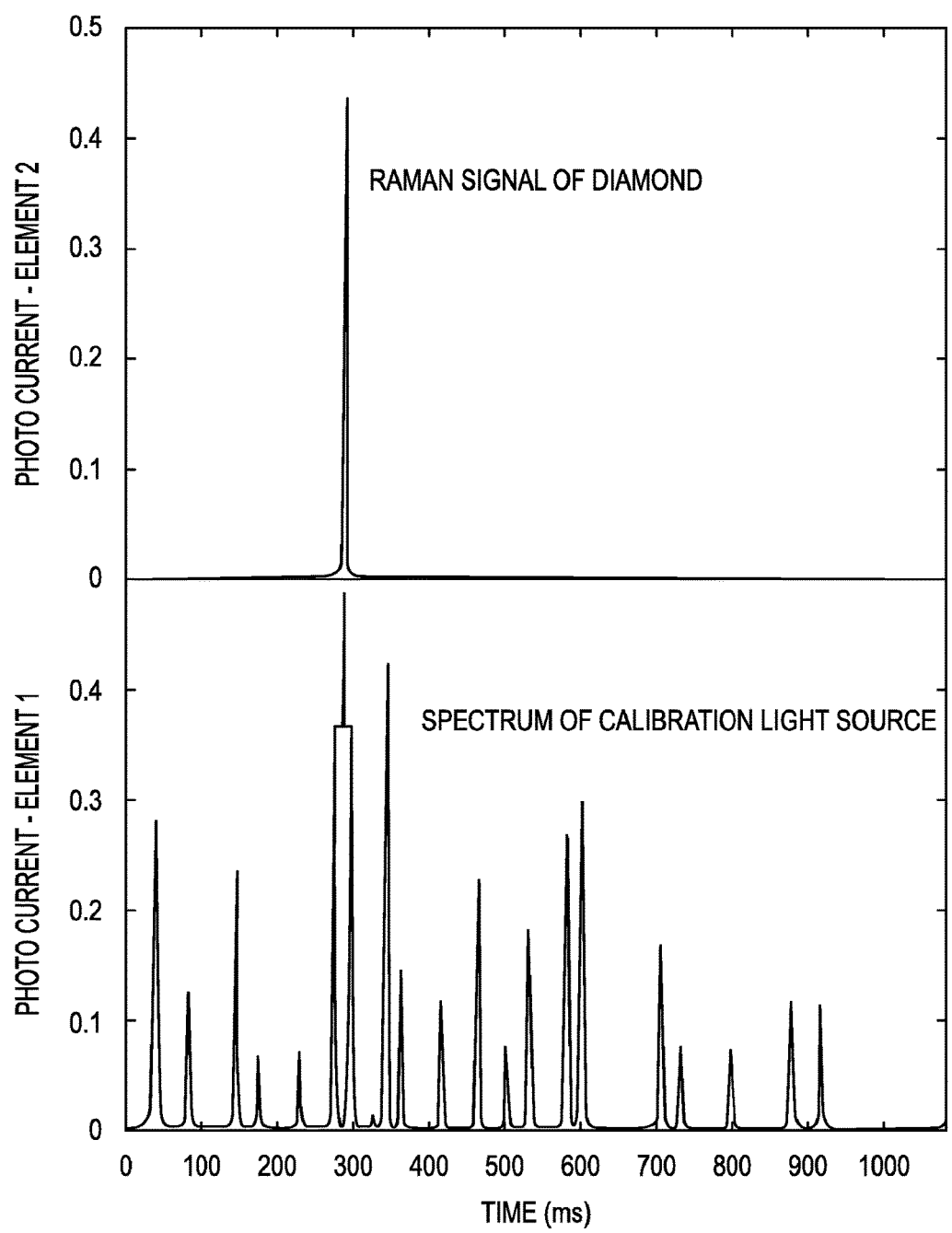
FIG. 13 shows the photocurrent of sensing elements 1 and 2 with respect to time as the grating rotates in accordance with some embodiments.

The upper portion of FIG. 13 shows the photocurrent of sensing element 2 with respect to time as the grating rotates. The lower portion of FIG. 13 shows the photocurrent of sensing element 1 with respect to time as the grating rotates. In this example, the output light sensed by sensing element 2 is from a diamond sample and the calibration light sensed by sensing element 1 from a neon light bulb. In accordance with some embodiments, the wavelength, w, of a Raman output signal is obtained by using two spectral lines of calibration light as references. As indicated in FIG. 13, sensing element 1 receives calibration light at wavelength w1 at time t1, and wavelength w2 at time t2. Between t1 and t2, sensing element 2 receives the Raman signal of a diamond at time t. The wavelength of diamond's Raman signal, w, can be calculated, e.g., by a processor disposed within the housing 801 (see FIG. 8) of the spectrometer, using the following equation, $$w = w1 + (w2 - w1)/(t2 - t1)*(t - t1). \quad [\text{Eq. 1}]$$

For equation 1, the grating's rotation speed is assumed to be substantially uniform between time t1 and t2.

Similarly if, instead of time, a rotary potentiometer attached to the grating is used to monitor the rotation of the grating, the potentiometer's resistance reading can be used to calculate the wavelength of the Raman signal. For example, if the potentiometer's readings at w1, w, and w2 are R1, R and R2 respectively, the unknown wavelength, w, can be obtained using the following equation, $$w = w1 + (w2 - w1)/(R2 - R1)*(R - R1). \quad [\text{Eq. 2}]$$

Embodiments described herein involve a real time wavelength calibration mechanism for a compact spectrometer. The calibration mechanism includes a light source, such as a neon bulb, with known spectral lines. According to some implementations, the calibration mechanism may use a light guide to direct the calibration light to the input slit of the spectrometer. For example, the light guide may comprise a prism, a fiber, a lens, a mirror, or a combination of these components.

Embodiments disclosed herein include:

Embodiment 1

A spectrometer device, comprising:

an excitation light source configured to generate excitation light having at least first and second distinct wavelength bands derived from a single source, the excitation light source arranged to simultaneously illuminate a spot on a sample with the first and the second wavelength bands;

a dispersive element comprising at least one movable component, the dispersive element configured to spatially separate output light emanating from the sample in response to the excitation light into a plurality of different wavelength bands, the at least one moveable component configured to scan the plurality of different wavelength bands of the output light across a detector; and the detector comprising at least one light sensor configured to sense the wavelength bands of the output light and to generate an output electrical signal in response to the sensed output light.

Embodiment 2

The device of embodiment 1, wherein the output light comprises a Raman signal.

Embodiment 3

The device of any of embodiments 1 through 2, wherein the output light comprises fluorescent light.

Embodiment 4

The device of any of embodiments 1 through 3, wherein an optical path of the device comprises a three dimensional (3D) folded geometric light path, the 3D folded geometric light path comprising a first portion lying in a first plane and including a first bend and a second portion lying in a different, second plane and including a second bend.

Embodiment 5

The device of any of embodiments 1 through 4, wherein the single excitation light source comprises;

a laser that emits excitation light in the first wavelength band; and an optical element configured to convert a portion of the first wavelength band of excitation light into the second wavelength band of excitation light.

Embodiment 6

The device of embodiment 4, wherein the optical element is disposed within a laser cavity of the laser.

Embodiment 7

The device of embodiment 4, wherein the optical element is disposed outside the laser cavity of the laser.

Embodiment 8

The device of embodiment 4, wherein:
the laser comprises solid state laser; and
the optical element comprises a second harmonic generator configured to double a frequency of the first wavelength band of excitation light.

Embodiment 9

The device of embodiment 8, wherein:
the laser is pumped by a diode that emits pump light having a third wavelength band; and
the excitation light source is arranged so that the pump light illuminates the spot.

Embodiment 10

The device of embodiment 9, wherein the third wavelength band is centered at about 808 nm.

Embodiment 11

The device of embodiment 9, wherein the first wavelength band is centered at about 1064 nm.

Embodiment 12

The device of embodiment 9, wherein the second wavelength band is centered at about 532 nm.

Embodiment 13

The device of any of embodiments 1 through 12, further comprising a beam splitter disposed in the optical path between the light source and the sample.

Embodiment 14

The device of embodiment 13, further comprising a laser line filter disposed between the light source and the beam splitter or between the beam splitter and the sample, the laser line filter configured to substantially pass the first and second wavelength bands and to substantially block other wavelengths.

Embodiment 15

The device of embodiment 14, wherein the beam splitter comprises a dichroic band pass filter.

Embodiment 16

The device of embodiment 14, wherein the beam splitter comprises a 45 degree notch filter.

Embodiment 17

The device of embodiment 16, further comprising an optical filter disposed in the optical path between the sample and the beam splitter configured to substantially pass the output light and to substantially block the excitation light.

Embodiment 18

The device of embodiment 17, further comprising:
a slit disposed in the optical path; and
a lens disposed in the optical path between the optical filter and the slit, the lens configured to focus the Raman signal onto the slit.

Embodiment 19

The device of embodiment 18, further comprising a concave mirror configured to receive the output light from the dispersive element.

Embodiment 20

The device of embodiment 18, further comprising a concave mirror configured to direct the light onto the dispersive element.

Embodiment 21

The device of any of embodiments 19 through 20, further comprising a mirror actuator configured to rotate the concave mirror.

Embodiment 22

The device of embodiment 21, wherein the mirror actuator comprises a motor configured to rotate the concave mirror.

Embodiment 23

The device of embodiment 21, wherein the mirror actuator comprises a shape memory alloy (SMA) actuator configured to rotate the concave mirror.

Embodiment 24

The device of claim 21, wherein the mirror actuator comprises a solenoid actuator configured to rotate the concave mirror.

Embodiment 25

The device of embodiment 21, wherein the mirror actuator comprises a piezoelectric actuator configured to rotate the concave mirror.

Embodiment 26

The device of embodiment 21, further comprising a mirror angle sensor configured to detect a rotational angle of the mirror.

Embodiment 27

The device of embodiment 26, wherein the mirror angle sensor comprises at least one of a:
a magnetic angle sensor;
a MEMS based gyroscope;
an imaging sensor array;
an optical position sensing detector;
a capacitance sensor.

Embodiment 28

The device of any of embodiments 1 through 27, wherein the dispersive element comprises:

a diffraction grating configured to diffract the wavelength bands of the output light; and a grating actuator mounted to the diffraction grating and configured to rotate the diffraction grating, wherein as the diffraction grating is rotated by the grating actuator, different wavelength bands of the output light fall on the detector when the diffraction grating is at different positional angles.

Embodiment 29

The device of embodiment 28, further comprising a grating angle sensor configured to detect the positional angles of the grating.

Embodiment 30

The device of embodiment 28, wherein the grating actuator comprises a motor configured to rotate the diffraction grating.

Embodiment 31

The device of embodiment 28, wherein the grating actuator comprises a shape memory alloy SMA actuator configured to rotate the diffraction grating.

Embodiment 32

The device of embodiment 28, wherein the grating actuator comprises a solenoid actuator configured to rotate the diffraction grating.

Embodiment 33

The device of embodiment 28, wherein the grating actuator comprises a piezoelectric actuator configured to rotate the diffraction grating.

Embodiment 34

The device of embodiment 28, further comprising a grating angle sensor configured to detect the positional angles of the grating.

Embodiment 35

The device of any of embodiments 1 through 34, wherein the at least one light sensor comprises only one light sensor.

Embodiment 36

The device of any of embodiments 1 through 35, wherein the at least one light sensor comprises an InGaAs sensor.

Embodiment 37

The device of any of embodiments 1 through 37, wherein the detector comprises:
a first light sensor and a second light sensor; and
a first bandpass filter associated with the first light sensor and a second band pass filter associated with the second light sensor.

Embodiment 38

The device of embodiment 37, wherein:
the first bandpass filter is configured to substantially pass output light that is responsive to the first wavelength band of the excitation light and to substantially block a output light that is responsive to the second wavelength band of the excitation light; and
the second bandpass filter is configured to substantially pass the output light that is responsive to the second wavelength band of the excitation light and to substantially block the output light that is responsive to the first wavelength band of the excitation light.

Embodiment 39

The device of any of embodiments 1 through 38, further comprising a calibration mechanism configured to allow real time calibration of device.

Embodiment 40

A spectrometer system, comprising:
a spectrometer device, comprising:
an excitation light source configured to generate excitation light having at least first and second distinct wavelength bands derived from a single source, the excitation light source arranged to illuminate a spot on a sample simultaneously with the first and the second wavelength bands;
a dispersive element comprising at least one movable component, the dispersive element configured to spatially separate an output light emanating from the sample in response to the excitation light into a plurality of different wavelength bands, the at least one moveable component configured to scan the plurality of different wavelength bands of the output light across a detector; and
the detector including at least one light sensor configured to sense the wavelength bands of the output light and to generate an electrical output signal in response to the output light; and
electronic circuitry configured to perform one or more of controlling power of the excitation light source, controlling movement of the at least one moveable component, and signal processing the electrical output signal of the detector.

Embodiment 41

The system of embodiment 40, wherein the output light is generated by Raman scattering.

Embodiment 42

The system of any of embodiments 40 through 41, wherein the output light is fluorescent light.

Embodiment 43

The system of any of embodiments 40 through 42, further comprising an accessory device, wherein the spectrometer device includes communication circuitry configured to communicate with the accessory device.

Embodiment 44

The system of embodiment 43, wherein:
the communication circuitry is configured to transfer information obtained from the output signal to the accessory device; and the accessory device is configured to process the information to obtain processed information.

Embodiment 45

The system of embodiment 44, wherein the accessory device is configured to cause at least one of the output signal information and the processed information to be stored in memory.

Embodiment 46

The system of embodiment 44, wherein:
the output signal information comprises spectra of the output light; and
the accessory device is configured to process the output signal information by comparing the spectra of the output light to known spectra.

Embodiment 47

A spectrometer device, comprising:
an optical assembly that includes:
an excitation light source configured to generate excitation light, the excitation light source arranged to illuminate a spot on a sample;
a dispersive element comprising at least one movable component, the dispersive element configured to spatially separate an output light emanating from the sample in response to the excitation light into a plurality of different wavelength bands, the at least one moveable component configured to scan the plurality of different wavelength bands of the output light across a detector;
the detector comprising at least one light sensor configured to sense the wavelength bands of the output light; and
a three dimensional (3D) geometric path for the output light that changes direction at least four times between the sample and the detector.

Embodiment 48

The system of embodiment 47, wherein the output light is generated by Raman scattering.

Embodiment 49

The system of any of embodiments 47 through 48, wherein the output light is fluorescent light.

Embodiment 50

The device of any of embodiments 47 through 49, further comprising a housing, the optical assembly disposed within an interior cavity of housing, wherein a length of the interior cavity is less than about ½ of a total length of the optical path.

Embodiment 51

The device of any of embodiments 47 through 49, further comprising a housing, the excitation light source, the dispersive element, the detector, and the geometric path disposed within an interior cavity of housing, wherein a length of the interior cavity is less than about ⅓ of a total length of the optical path.

Embodiment 52

The device of any of embodiments 47 through 49, further comprising a housing, the excitation light source, the dispersive element, the detector, and the geometric path disposed within an interior cavity of housing, wherein total volume of the housing is less than about 500 $cm^3$.

Embodiment 53

The device of any of embodiments 47 through 49, further comprising a housing, the excitation light source, the dispersive element, the detector, and the optical path disposed within an interior cavity of housing, wherein a total volume of the interior volume of the housing is less than about 300 $cm^3$.

Embodiment 54

The device of any of embodiments 47 through 49, further comprising a housing, the excitation light source, the dispersive element, the detector, and the geometric path disposed within an interior cavity of housing, wherein a length of the housing is less than about 150 mm, a width of the housing is less than about 40 mm, and a height of the housing is less than about 50 mm.

Embodiment 55

The device of any of embodiments 47 through 54, wherein the dispersive element is a reflection grating.

Embodiment 56

The device of any of embodiments 47 through 55, wherein the 3D geometric path changes direction at least two times or at least three times between the sample diffraction and the grating.

Embodiment 57

The device of any of embodiments 47 through 55, wherein the 3D geometric path changes directions at least three times or at least four times between the sample and the diffraction grating.

Embodiment 58

The device of any of embodiments 47 through 57, further comprising a collimating mirror disposed between the sample and the dispersive element.

Embodiment 59

The device of embodiment 58, wherein the collimating mirror is an aspherical mirror.

Embodiment 60

The device of embodiment 58, wherein the collimating mirror is a parabolic mirror.

Embodiment 61

The device of any of embodiments 47 through 60, further comprising a focusing mirror disposed between the dispersive element and the detector.

Embodiment 62

The device of embodiment 61, wherein the focusing mirror is an aspherical mirror.

Embodiment 63

A compact spectrometer device comprising;
a lens configured to receive output light emanating from a sample in response to excitation light, the lens focusing the output light along a first section of a geometric light path of the output light;
a first mirror that reflects the output light received from the lens to bend the geometric light path and create a second section of the geometric light path, the first section and the second section of the geometric light path in a first plane;
a second mirror that reflects the output light received from the first mirror to create a third section of the geometric light path, the third section of the geometric light path traveling in a plane different from the first plane; and
a detector configured to detect the output light reflected by the second mirror.

Embodiment 64

The device of embodiment 63 further comprising:
a grating configured to receive light from the second mirror and to separate the output light received from the second mirror into different angles, each angle corresponding to a wavelength of the output light received; and
a concave mirror configured to collimate and direct the output light from the grating to the detector.

Embodiment 65

The device of any of embodiments 63 through 64, wherein the detector has dimensions of less than about 3 mm by about 1 mm.

Embodiment 66

The device of any of embodiments 63 through 65 further comprising an excitation light source configured to provide the excitation light, wherein a total length of geometric light path of the device is a sum of a length of a geometric path of the excitation light and a length of the geometric path of the output light.

Embodiment 67

The device of embodiment 66 wherein a longest dimension of an outer housing framing the device is less than one half a length of the total geometric path.

Embodiment 68

The device of embodiment 66 wherein a longest dimension of an outer housing framing the device is less than one third a length the total geometric light path.

Embodiment 69

The device of any of embodiments 63 through 68 wherein a longest dimension of the outer housing framing the device is less than six inches.

Embodiment 70

An optical assembly for use in a compact spectrometer, the optical assembly comprising:
a lens configured to receive output light emanating from a sample;
a concave collimating mirror configured to direct the output light from the lens to a grating;
a dispersive element configured to spatially separate the different wavelengths of the output light into different directions; and,
a concave focusing mirror configured to direct a portion of the output light from the grating to a detector.

Embodiment 71

The optical assembly of embodiment 70, wherein the concave collimating mirror is aspheric.

Embodiment 72

The optical assembly of any of embodiments 70 through 71, wherein the dispersive element comprises:
a grating; and
a motor configured to rotate the grating.

Embodiment 73

The optical assembly of any of embodiments 70 through 72, wherein the concave collimating mirror is parabolic.

Embodiment 74

A spectrometer device, comprising:
at least one light source configured to generate excitation light that illuminates a spot on a sample, the at least one light source also configured to generate calibration light;
a dispersive element comprising at least one movable component, the dispersive element configured to spatially separate an output light emanating from the sample in response to the excitation light and the calibration light into a plurality of different wavelength bands, the at least one moveable component configured to scan the plurality of different wavelength bands of the output light and the calibration light across a detector;
the detector comprising a plurality of elements, at least one first element configured to sense the wavelength bands of the calibration light and to output an electrical calibration signal in response to the calibration light and at least one second element configured to sense the output light and to output an electrical output signal in response to the calibration light;
a processor configured to adjust the output signal using the calibration signal; and
a housing that encloses the at least one light source, the dispersive element, the detector, and the processor.

Embodiment 75

The device of embodiment 74, wherein the output light is generated by Raman scattering.

Embodiment 76

The device of any of embodiments 74 through 75, wherein the output light is fluorescent light.

Embodiment 77

The device of any of embodiments 74 through 76, wherein the at least one light source comprises:
an excitation light source configured to generate the excitation light; and a calibration light source configured to generate the calibration light.

Embodiment 78

The device of embodiment 77, wherein the calibration light source comprises a neon light bulb.

Embodiment 79

The device of embodiment 77, wherein the calibration light source comprises an argon light bulb.

Embodiment 80

The device of any of embodiments 74 through 79, wherein the at least one light source comprises a single light source.

Embodiment 81

The device of embodiment 80, wherein the single light source comprises a multi-wavelength laser configured to emit light in at least a first wavelength band and a second wavelength band, wherein the excitation light comprises light emitted from the multi-wavelength laser in the first wavelength band and the calibration light comprises light emitted from the multi-wavelength laser in the second wavelength band.

Embodiment 82

The device of any of embodiments 74 through 81, further comprising at least one optical element disposed between the at least one light source and the dispersive element, the optical element configured to redirect the calibration light from the at least one light source toward the dispersive element.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Various modifications and alterations of these embodiments will be apparent to those skilled in the art and it should be understood that this scope of this disclosure is not limited to the illustrative embodiments set forth herein. For example, the reader should assume that features of one disclosed embodiment can also be applied to all other disclosed embodiments unless otherwise indicated.

The invention claimed is:

1. A spectrometer, comprising:
   at least one light source configured to generate excitation light having at least first and second distinct wavelength bands derived from a single source, the excitation light source arranged to simultaneously illuminate a spot on a sample with the first and the second wavelength bands, the at least one light source configured to provide calibration light;
   a light guide configured to route the calibration light to a dispersive element;
   the dispersive element comprising at least one movable component, the dispersive element configured to spatially separate output light emanating from the sample in response to the excitation light into a plurality of different wavelength bands, the at least one moveable component configured to scan the plurality of different wavelength bands of the output light across a detector; and
   the detector comprising at least one light sensor configured to sense the wavelength bands of the output light and to generate an output electrical signal in response to the sensed output light.

2. The spectrometer of claim 1, wherein an optical path of the spectrometer comprises a three dimensional (3D) folded geometric light path, the 3D folded geometric light path comprising a first portion lying in a first plane and including a first bend and a second portion lying in a different, second plane and including a second bend.

3. The spectrometer of claim 1, wherein:
   the excitation light source comprises solid state laser; and
   further comprising a diode that emits pump light to pump the solid state laser, the pump light having a third wavelength band, wherein the excitation light source is arranged so that the pump light illuminates the spot.

4. The spectrometer of claim 1, wherein the dispersive element comprises:
   a diffraction grating configured to diffract the wavelength bands of the output light; and
   a grating actuator mounted to the diffraction grating and configured to rotate the diffraction grating, wherein as the diffraction grating is rotated by the grating actuator, different wavelength bands of the output light fall on the detector when the diffraction grating is at different positional angles and wherein the grating actuator comprises a shape memory alloy (SMA) actuator configured to rotate the diffraction grating.

5. The spectrometer of claim 4, further comprising a magnetic grating angle sensor configured to detect the positional angles of the grating.

6. The spectrometer of claim 1, wherein the at least one light sensor comprises only one light sensor.

7. The spectrometer of claim 1, wherein the detector comprises:
   a first light sensor and a second light sensor; and
   a first bandpass filter associated with the first light sensor and a second band pass filter associated with the second light sensor.

8. The spectrometer of claim 1, further comprising electronic circuitry configured to perform one or more of controlling power of the excitation light source, controlling movement of the at least one moveable component, and signal processing the electrical output signal of the detector.

9. The spectrometer of claim 8, further comprising an accessory device, the spectrometer device including communication circuitry configured to communicate wirelessly with the accessory device, wherein
   the communication circuitry is configured to transfer information obtained from the output signal to the accessory device; and
   the accessory device is configured to process the information to obtain processed information.

10. The spectrometer of claim 1, wherein the light guide comprises one or more of a prism, a fiber, a lens, and a mirror.

11. A spectrometer, comprising:
an optical assembly that includes:
at least one light source configured to generate excitation light, the excitation light source arranged to illuminate a spot on a sample, the at least one light source also configured to provide calibration light;
a light guide configured to route the calibration light to the dispersive element;
the dispersive element comprising at least one movable component, the dispersive element configured to spatially separate an output light emanating from the sample in response to the excitation light into a plurality of different wavelength bands, the at least one moveable component configured to scan the plurality of different wavelength bands of the output light across a detector;
the detector comprising at least one light sensor configured to sense the wavelength bands of the output light; and
a three dimensional (3D) geometric path for the output light that changes direction at least four times between the sample and the detector.

12. The spectrometer of claim 11, further comprising a housing, the optical assembly disposed within an interior cavity of housing, wherein a length of the interior cavity is less than about ½ of a total length of the optical path.

13. The spectrometer of claim 11, further comprising a housing, the excitation light source, the dispersive element, the detector, and the geometric path disposed within an interior cavity of housing, wherein total volume of the housing is less than about 500 cm$^3$.

14. The spectrometer of claim 11, further comprising a housing, the excitation light source, the dispersive element, the detector, and the geometric path disposed within an interior cavity of housing, wherein a length of the housing is less than about 150 mm, a width of the housing is less than about 40 mm, and a height of the housing is less than about 50 mm.

15. The spectrometer of claim 11, wherein the 3D geometric path changes direction at least two times or at least three times between the sample and the dispersive element.

16. The spectrometer of claim 11, further comprising:
a collimating mirror disposed between the sample and the dispersive element;
a focusing mirror disposed between the dispersive element and the detector, wherein at least one of the collimating mirror and the focusing mirror is an aspherical mirror.

17. The spectrometer of claim 11, wherein the light guide comprises one or more of a prism, a fiber, a lens, and a mirror.

18. A spectrometer, comprising:
at least one light source configured to generate excitation light that illuminates a spot on a sample, the at least one light source also configured to generate calibration light;
a light pipe configured to route the calibration light from the at least one light source to a dispersive element;
the dispersive element comprising at least one movable component, the dispersive element configured to spatially separate an output light emanating from the sample in response to the excitation light and the calibration light into a plurality of different wavelength bands, the at least one moveable component configured to scan the plurality of different wavelength bands of the output light and the calibration light across a detector;
the detector comprising a plurality of elements, at least one first element configured to sense the wavelength bands of the calibration light and to output an electrical calibration signal in response to the calibration light and at least one second element configured to sense the output light and to output an electrical output signal in response to the output light;
a processor configured to adjust the output signal using the calibration signal; and
a housing that encloses the at least one light source, the dispersive element, the detector, and the processor.

19. The spectrometer of claim 18, wherein the at least one light source comprises:
an excitation light source configured to generate the excitation light; and
a calibration light source configured to generate the calibration light.

20. The spectrometer of claim 19, wherein the at least one light source comprises a multi-wavelength laser configured to emit light in at least a first wavelength band and a second wavelength band, wherein the excitation light comprises light emitted from the multi-wavelength laser in the first wavelength band and the calibration light comprises light emitted from the multi-wavelength laser in the second wavelength band.

21. The spectrometer of claim 18, wherein a total volume of the housing is less than about 500 cm$^3$.

22. The spectrometer of claim 18, wherein a length of the housing is less than about 150 mm, a width of the housing is less than about 40 mm, and a height of the housing is less than about 50 mm.

23. The spectrometer of claim 18, wherein the light pipe comprises one or more of a prism, a fiber, a lens, and a mirror.

* * * * *